(12) United States Patent
Spahn et al.

(10) Patent No.: US 11,975,918 B2
(45) Date of Patent: May 7, 2024

(54) GRASS BAGGER STORAGE STAND (71) Applicant: DUBUQUE STAMPING & MANUFACTURING, INC., Dubuque, IA (US)

(72) Inventors: Matt Spahn, Peosta, IA (US); Ron Smyth, Dubuque, IA (US)

(73) Assignee: DUBUQUE STAMPING & MANUFACTURING, INC., Dubuque, IA (US)

( * ) Notice: Subject to any disclaimer, the term of this patent is extended or adjusted under 35 U.S.C. 154(b) by 193 days.

(21) Appl. No.: 17/448,800

(22) Filed: Sep. 24, 2021

(65) Prior Publication Data
US 2022/0097959 A1 Mar. 31, 2022

Related U.S. Application Data (60) Provisional application No. 63/198,055, filed on Sep. 25, 2020.

(51) Int. Cl.
*B65F 1/14* (2006.01)
*A01D 43/063* (2006.01)
*A01D 101/00* (2006.01)

(52) U.S. Cl.
CPC ........ *B65F 1/1415* (2013.01); *A01D 43/0636* (2013.01); *A01D 2101/00* (2013.01)

(58) Field of Classification Search
CPC ........ B65F 1/1415; B65F 1/141; A01D 43/06; A01D 43/07; A01D 2101/00; A01D 43/077; A01D 43/063; A01D 43/0636; B62B 2202/50; B62B 1/12; B62B 2202/22

USPC .......................................................... 248/98
See application file for complete search history.

(56) References Cited

U.S. PATENT DOCUMENTS

| 209,749 | A | | 11/1878 | Brown | |
|---|---|---|---|---|---|
| 1,542,164 | A | | 6/1925 | Nelson | |
| 2,560,059 | A | * | 7/1951 | Young | A01J 5/04 211/1 |
| 3,974,631 | A | | 8/1976 | Rhodes | |
| 4,095,398 | A | * | 6/1978 | Aumann | A01D 43/063 D15/15 |
| 4,158,279 | A | * | 6/1979 | Jackson | A01D 43/07 56/16.6 |
| 4,532,755 | A | * | 8/1985 | Schemelin | A01D 43/063 56/16.6 |

(Continued)

FOREIGN PATENT DOCUMENTS

GB 2177996 A 2/1987

*Primary Examiner* — Taylor Morris
(74) *Attorney, Agent, or Firm* — McKee, Voorhees & Sease, PLC (57) ABSTRACT

A stand is provided for storing a grass bagger or collection assembly removed from a lawn mower. The stand includes a base, which may include wheels, and a pair of upstanding arms to which the grass collection assembly is mounted. The arms include receivers, such as pins or plates, to which the frame of the bagger assembly is hooked. A fastener extends through at least of the arms and the bagger frame to prevent accidental falling of the frame from the stand. The stand includes upstanding members over which the bagger chute can be mounted to store the chute in an upright position adjacent the grass collector frame and bag. A shelf may be provided on the stand to store other bagger accessories.

17 Claims, 8 Drawing Sheets

(56) References Cited

U.S. PATENT DOCUMENTS

| | | | | |
|---|---|---|---|---|
| 4,567,623 A | * | 2/1986 | Walton | E01H 1/08 83/660 |
| 4,629,203 A | * | 12/1986 | Ballard | B62B 1/12 294/51 |
| 4,735,037 A | * | 4/1988 | Benter | A01D 43/077 56/13.3 |
| 4,757,966 A | | 7/1988 | Harris | |
| 4,770,440 A | * | 9/1988 | Lander | A01D 34/001 280/760 |
| 4,819,898 A | | 4/1989 | Benoit et al. | |
| 4,852,338 A | * | 8/1989 | Hopkins | A01D 43/063 56/202 |
| 4,881,362 A | * | 11/1989 | Parker | A01D 43/077 56/16.6 |
| 4,907,403 A | * | 3/1990 | Jones | A01D 43/0635 56/16.6 |
| 4,922,696 A | * | 5/1990 | Burns | A01D 43/07 56/203 |
| 4,941,231 A | * | 7/1990 | Jarosak | A01D 43/077 15/328 |
| 4,986,062 A | * | 1/1991 | Hill | A01D 43/0633 56/16.9 |
| 4,993,107 A | * | 2/1991 | Zoni | A47L 5/28 15/352 |
| 5,058,235 A | * | 10/1991 | Charky | E01H 1/08 15/352 |
| 5,070,687 A | * | 12/1991 | Schweigert | A01D 43/07 56/16.6 |
| 5,291,722 A | * | 3/1994 | Schweigert | A01D 43/07 56/203 |
| 5,685,134 A | * | 11/1997 | Thornburg | A01D 43/00 56/12.9 |
| 5,778,648 A | * | 7/1998 | Parkes | A01D 43/077 56/13.3 |
| 5,983,613 A | * | 11/1999 | Winter | A01D 43/077 56/13.3 |
| 6,226,970 B1 | * | 5/2001 | Busboom | A01D 43/063 56/16.6 |
| 6,644,003 B1 | * | 11/2003 | Bass | A01G 3/002 56/12.8 |
| 6,658,833 B2 | * | 12/2003 | Dunning | B02C 18/14 56/16.6 |
| 6,705,575 B1 | | 3/2004 | Hoy | |
| D569,877 S | * | 5/2008 | Tyler | D15/27 |
| 8,550,284 B1 | * | 10/2013 | Morad | B65F 1/1415 248/101 |
| 9,084,393 B1 | * | 7/2015 | Singleton | A01D 43/0636 |
| 9,107,343 B1 | * | 8/2015 | Gaeddert | A01D 43/063 |
| 9,215,844 B2 | * | 12/2015 | Ronning | A01D 43/077 |
| 9,750,186 B2 | * | 9/2017 | Hurst | A01D 43/0636 |
| 10,017,198 B1 | * | 7/2018 | Stamper | B62B 1/20 |
| 10,292,328 B2 | * | 5/2019 | Cracraft | A01D 43/0631 |
| D851,934 S | | 6/2019 | Parcels et al. | |
| 11,440,570 B1 | * | 9/2022 | Kerr | B62B 1/12 |
| 2008/0309038 A1 | | 12/2008 | Gilligan | |
| 2010/0096514 A1 | | 4/2010 | Adair et al. | |
| 2012/0045306 A1 | * | 2/2012 | Fisher | B62B 3/10 193/2 R |
| 2015/0190021 A1 | * | 7/2015 | Barkow | E01H 1/0809 15/405 |
| 2018/0054966 A1 | * | 3/2018 | Volovsek | A01D 43/063 |
| 2018/0255708 A1 | * | 9/2018 | Berglund | A01D 43/077 |
| 2019/0320583 A1 | * | 10/2019 | Asahara | A01D 43/0636 |
| 2020/0247445 A1 | * | 8/2020 | Daly, Sr. | B62B 3/08 |
| 2021/0039702 A1 | * | 2/2021 | Kutsuna | B62B 3/08 |
| 2022/0119056 A1 | * | 4/2022 | Hizmi | B62B 1/266 |
| 2022/0274213 A1 | * | 9/2022 | Luber | B23K 37/0258 |
| 2023/0225252 A1 | * | 7/2023 | Liu | A01D 34/78 56/11.9 |

* cited by examiner

GRASS BAGGER STORAGE STAND

CROSS-REFERENCE TO RELATED APPLICATIONS

This application claims priority to Provisional Application U.S. Ser. No. 63/198,055, filed on Sep. 25, 2020, which is herein incorporated by reference in its entirety.

BACKGROUND OF THE INVENTION

Conventional baggers include a frame to support 1-3 collection bags on the rear of a lawn or garden tractor with a chute extending between the mower deck and the collection bags. A blower may be provided between the mower deck and the bags to facilitate transfer of the cut grass clippings from the mower deck to the bags.

There are times when the grass bagger is not needed, and therefore is removed from the tractor by the owner or operator. For example, if the tractor is used in the winter for snowplowing or snow blowing, the there is no need for the bagger. However, the bagger is not self-supporting when removed from the tractor, and therefore storage of the bagger becomes problematic. Often, the bagger components are simply set on the floor in a disorganized manner, with the chute and blower detached from the frame and collection bags.

Therefore, there is a need for a storage solution for the grass bagger components when removed from the lawn or garden tractor.

Accordingly, a primary objective of the present invention is the provision of a stand for supporting the components of a grass bagger for storage when removed from the tractor or mower.

Another objective of the present invention is the provision of a grass bagger stand which can be easily moved with the bagger components mounted thereon.

Another objective of the present invention is the provision of a grass bagger stand which stores the bagger components in an organized manner.

Still another objective of the present invention of a method and means of mounting a lawn mower grass collector onto a stand for storage, without the use of tools.

A further objective of the present invention is the provision of a grass bagger stand which is stable when the grass bagger is mounted thereon.

Yet another objective of the present invention is the provision of a grass bagger stand which provides for quick and easy mounting and dismounting of the grass bagger to and from the stand.

Still another objective of the present invention is the provision of a grass bagger stand which supports the grass bagger in a position off the floor or above the ground.

These and other objectives will become apparent from the following description of the invention.

DETAILED DESCRIPTION OF THE INVENTION

The grass bagger stand of the invention is generally designated by the reference numeral 10 in the drawings. The stand includes a base 12 and a pair of upright arms 14. The arms 14 include a lower portion 16 bolted, welded, or otherwise fixed to a rear portion of the base 12, and upper portions 18 extending angularly forwardly from the lower portions 16. The lower and upper portions 16, 18 may be welded, bent, or otherwise formed into an angular or curved configuration.

In the preferred embodiment shown in FIGS. 1-8, the stand 10 includes a shelf 20 on the base 12 and wheels 22, such as castor wheels.

A pair of plates or posts 24 extend upwardly from the shelf 20 and are spaced laterally to one side of the arms 14.

Figure 1:
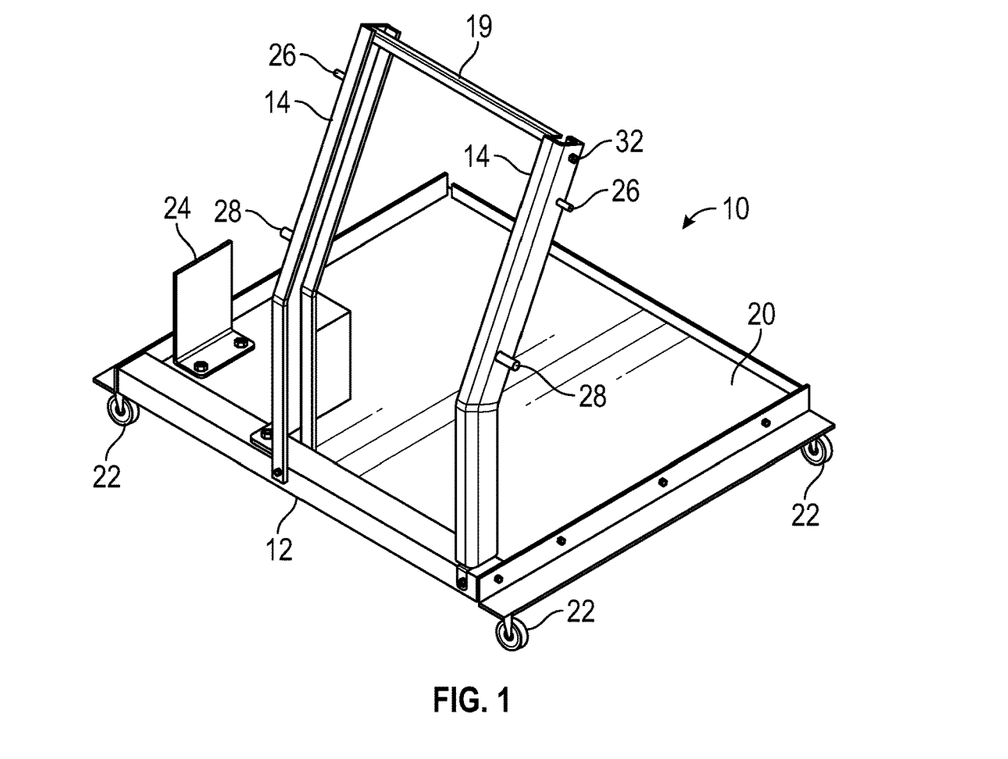
FIG. 1 is a perspective view of a preferred embodiment of the grass bagger stand according to the present invention.
Figure 2:
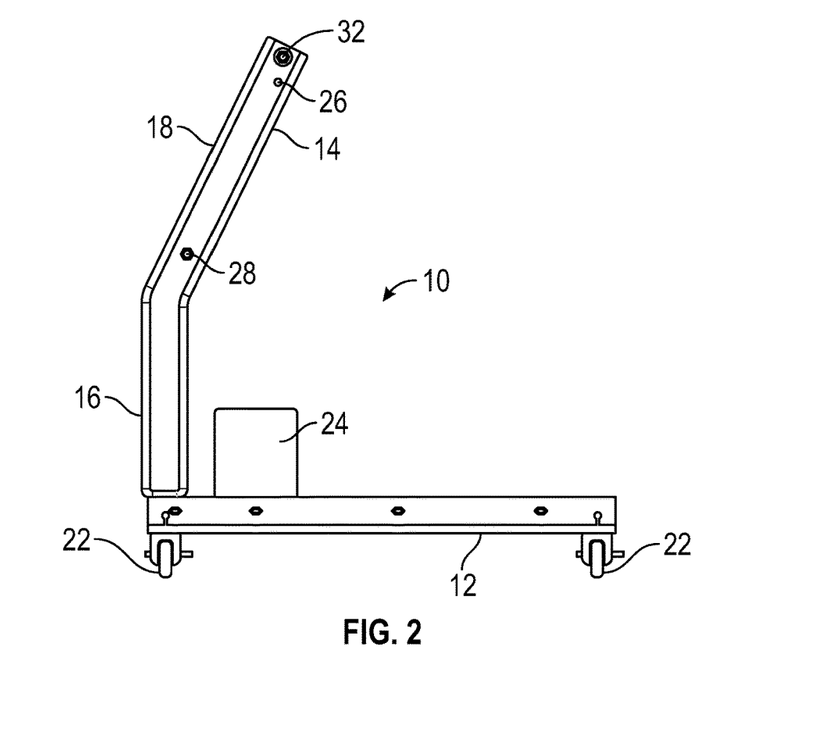
FIG. 2 is a side elevation view of the stand shown in FIG. 1.
Figure 3:
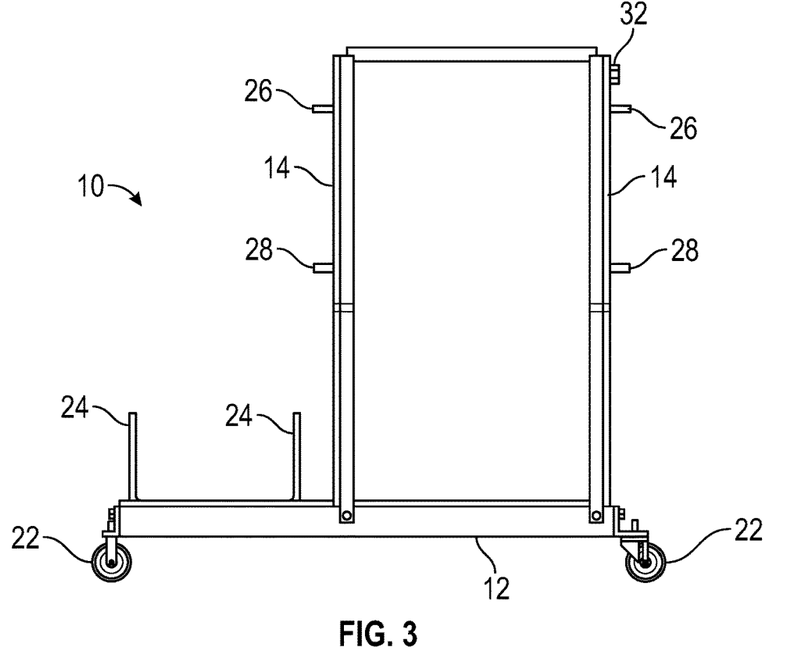
FIG. 3 is a rear elevation view of the stand of FIG. 1.
Figure 4:
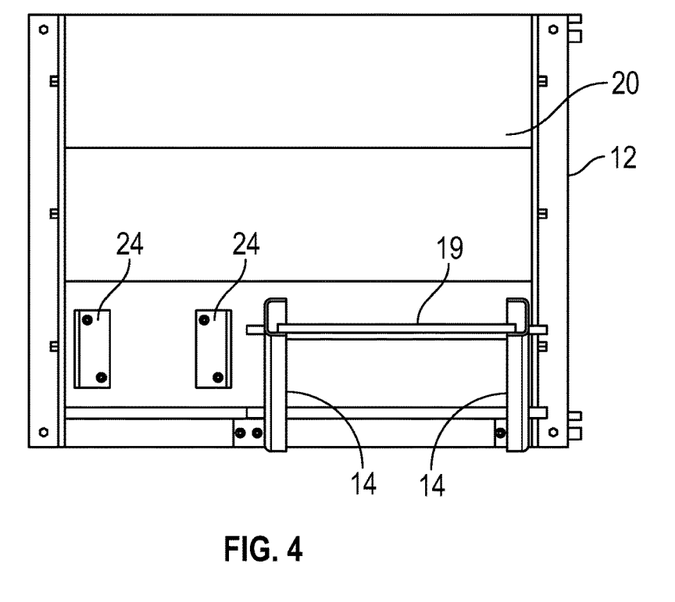
FIG. 4 is a top plan view of the stand of FIG. 1.
Figure 5:
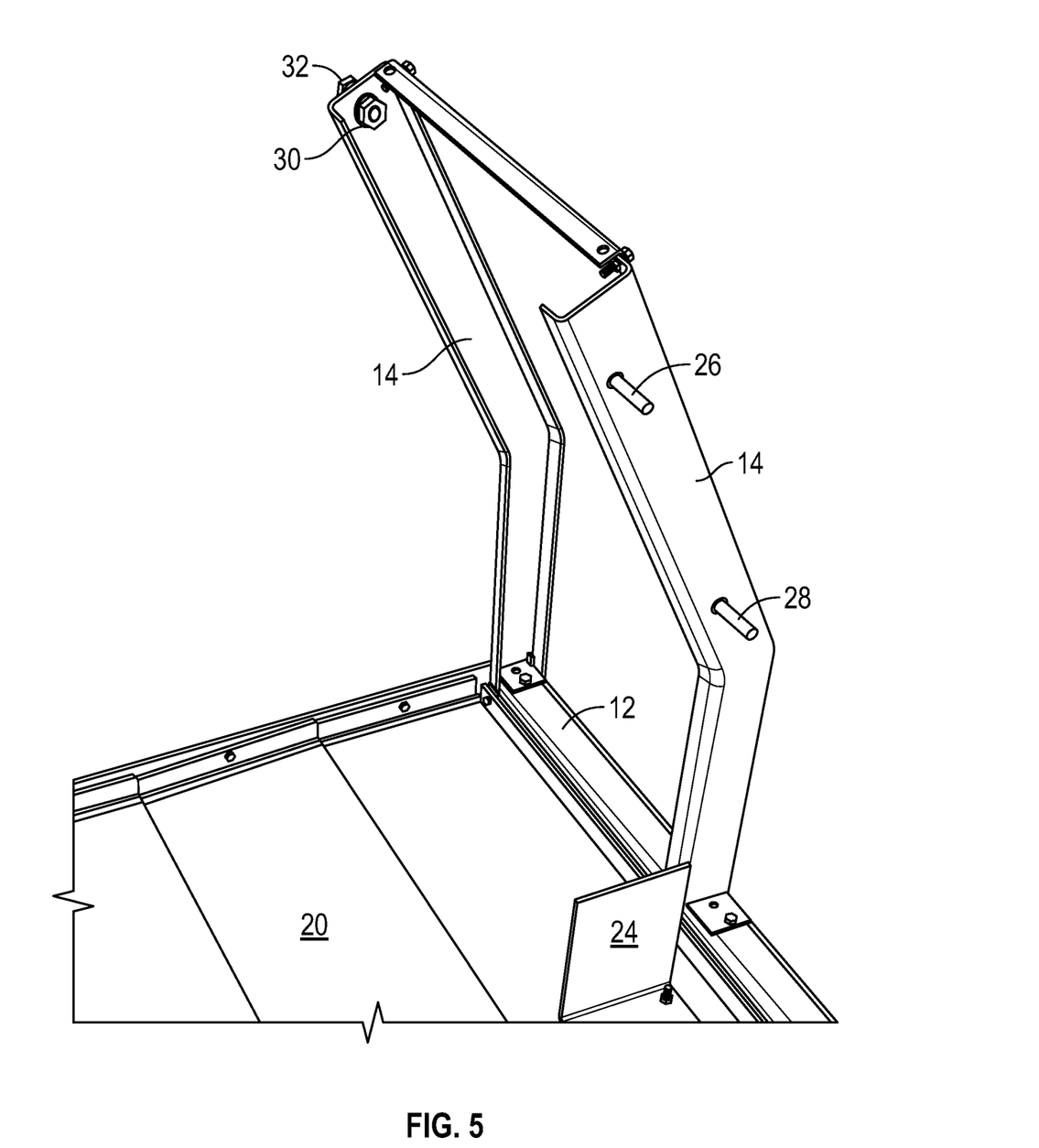
FIG. 5 is an enlarged view of the stand arms.

Each arm 14 includes an upper, outwardly extending pin 26 and a lower outwardly extending pin 28, as best seen in FIG. 3. The pins 26 and 28 function as receivers for hooks on the grass collector assembly, as described below. One of the arms 14 also includes a hole there through, with a nut 30 welded to the inside of the arms for receiving a securing bolt 32 through the hole.

The grass bagger or collector assembly 34 includes a frame 36, and one or more collection bags or collection bins 38 removably mounted on the frame 36 for receiving grass clippings. The bags or bins 38 have an open upper end which is closed with a pivotal cover 40. The cover is pivoted to an open position to remove the bags/bins 38 and allow grass clippings to be dumped or emptied from the bags/bins. The bagger assembly 34 also includes a chute or tube 42 having a lower end removably connected to the mower deck (not shown) and an upper end removably connected to the cover 40 so as to direct grass clippings from the mower deck into the bags/bins 38. A blower 44 may also be provided on the chute 42 to provide increased airflow for carrying grass clippings from the mower deck to the bags 38. The bagger frame 36 also includes a pair of upper arms 46 and a pair of lower arms 48, with each of the arms 46, 48 having a hook or notch, 50, 52, respectively, for mounting the frame to the mower tractor. This construction of the bagger assembly 34 is conventional.

After the chute 42 is detached from the bagger cover 40, and the bagger assembly 34 is removed from the lawn mower, the frame 36 with the bags/bins 38 thereon can be mounted onto the stand 10, without the use of tools for storage. More particularly, the frame 36 can be quickly and easily set into position on the stand 10 with the notches or hooks 52 of the lower frame arms 48 received on the lower pins 28 of the stand arms 14, and the hooks 50 of the upper frame arms 46 received on the upper pins 26 on the stand arms 14. Then, the bolt 32 can be extended through a hole in one of the upper frame arms 46 and through the hole in the upper portion of one of the arms 14 for threaded receipt in the nut 30, to prevent accidental disconnection between the stand arms 14 and the bagger assembly arms 46, 48. While one nut 30 and one bolt 32 is sufficient, a second nut and bolt combination can be utilized on the other arm 14 of the stand 10 to further secure the bagger assembly 34 to the stand 10. As another alternative to the nut 30 and bolt 32, a pin and cotter pin, or other fastener system, can be used to assure that the bagger assembly does not accidentally or inadvertently become disconnected from the stand.

Figure 6:
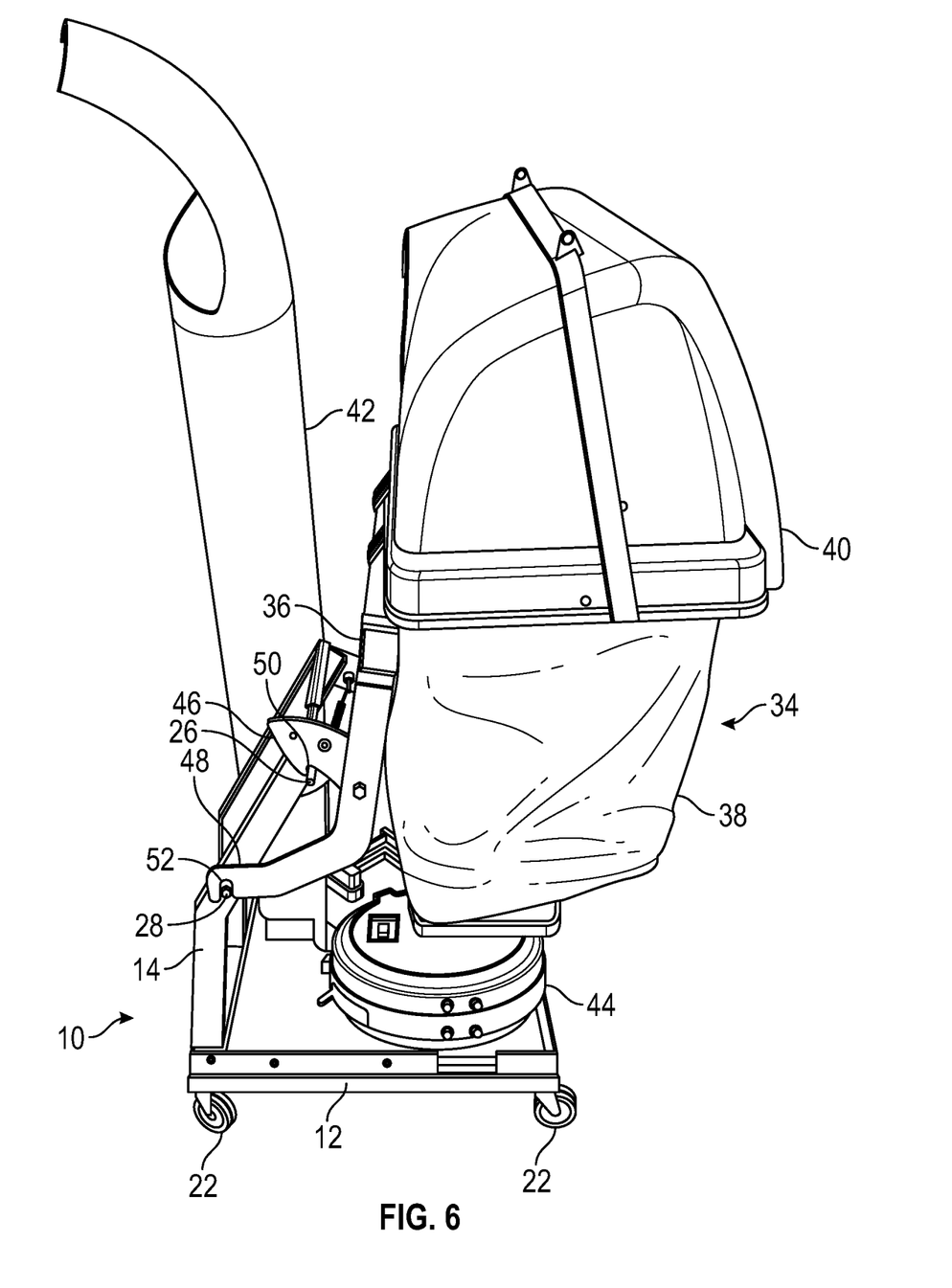
FIG. 6 is a side view of the stand in use with the grass bagger components positioned on the stand.
Figure 7:
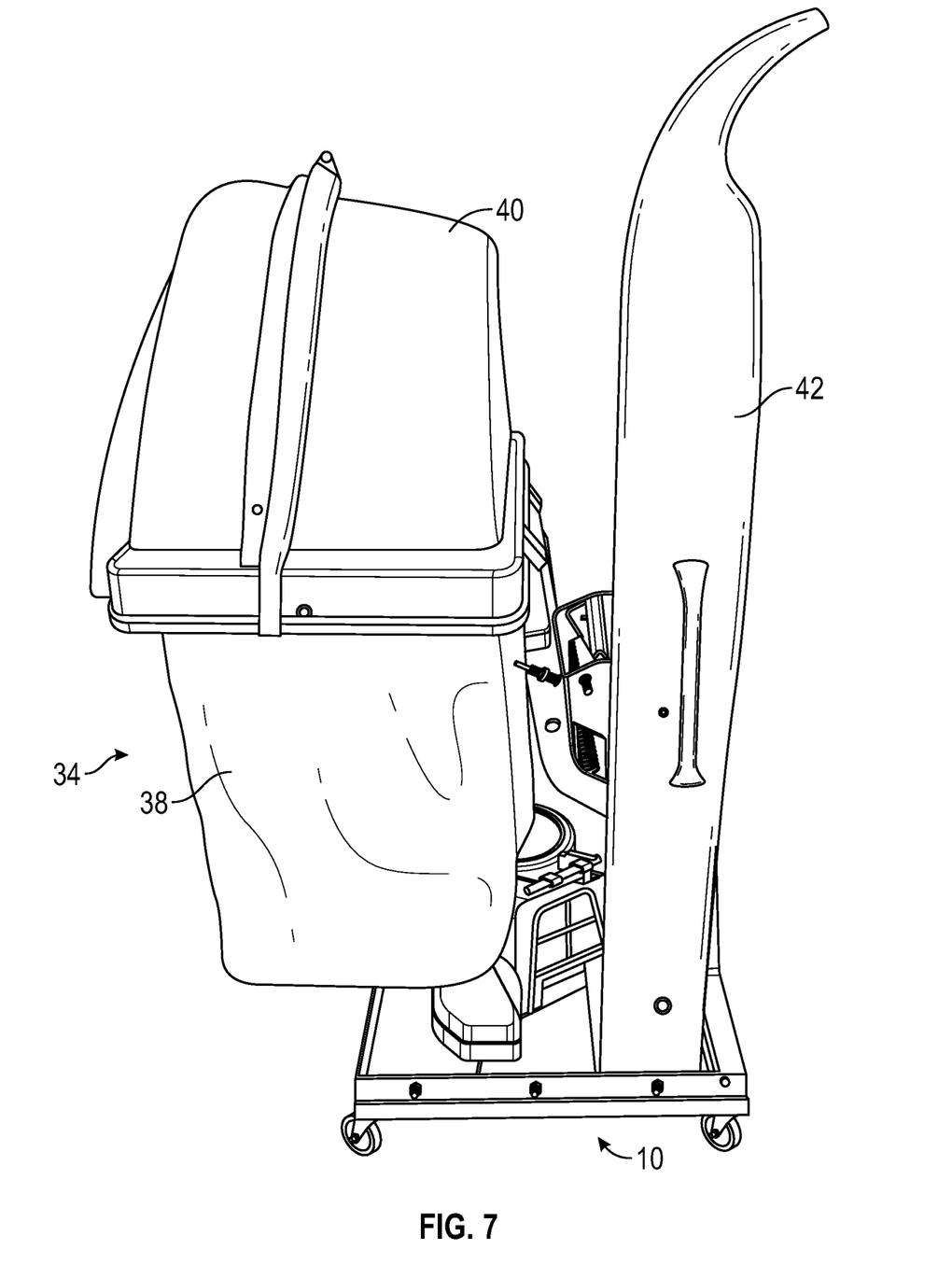
FIG. 7 is another side view of the stand in use, from the opposite side as shown in FIG. 6.
Figure 8:
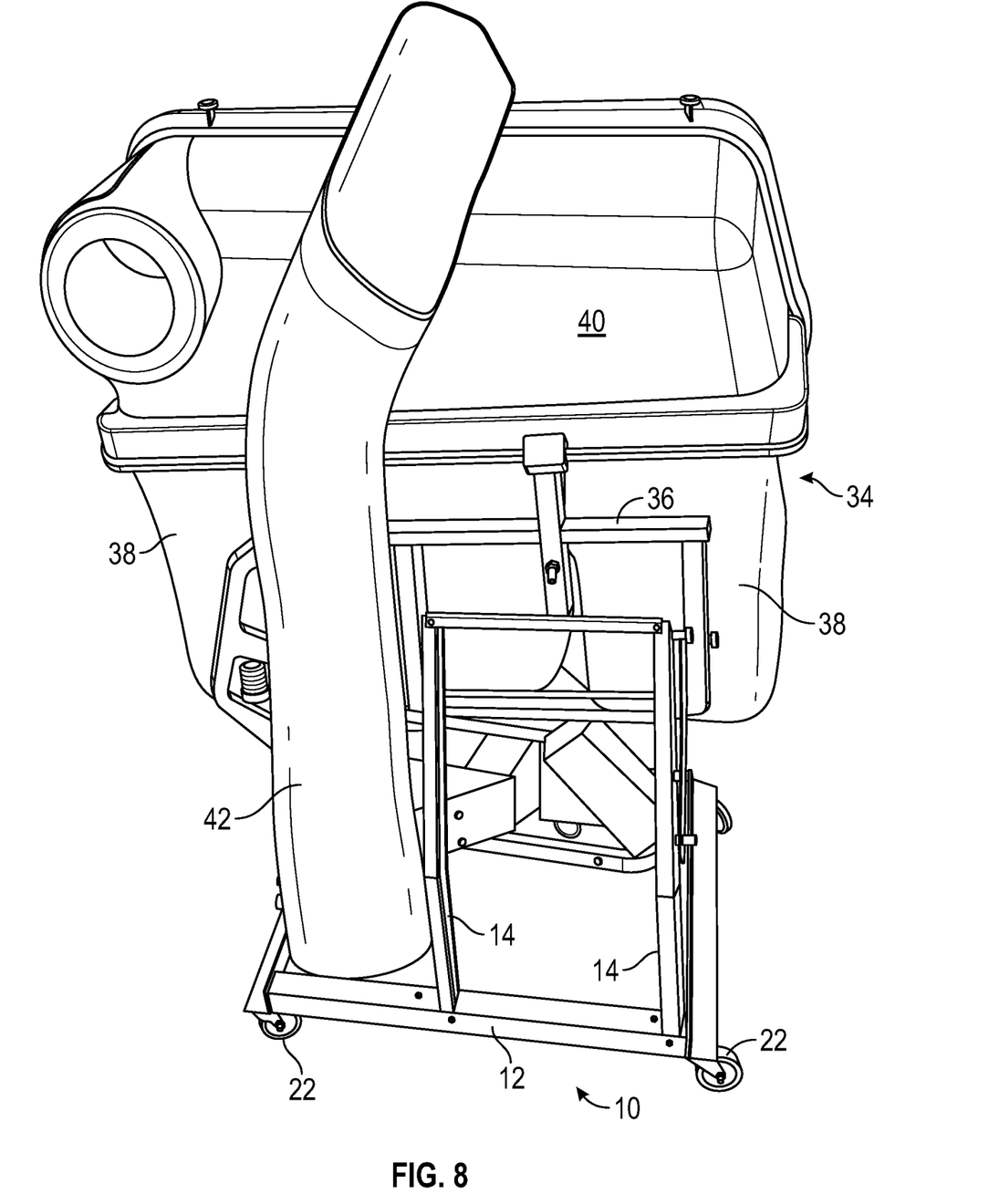
FIG. 8 is a rear view of the stand with the bagger components stored thereon.

The blower 44 can be set up on the shelf 20 beneath the bags/bins 38. The shelf 20 can also hold or store other parts or accessories of the grass bagger. The chute 42 can be mounted over the plates 24 so as to extend upwardly adjacent one side of the frame 36 as best seen in FIGS. 6, 7, and 8. The wheels 22 allow the stand 10 to be easily rolled to a desired location with the bagger assembly 34 mounted thereon.

Figure 9:
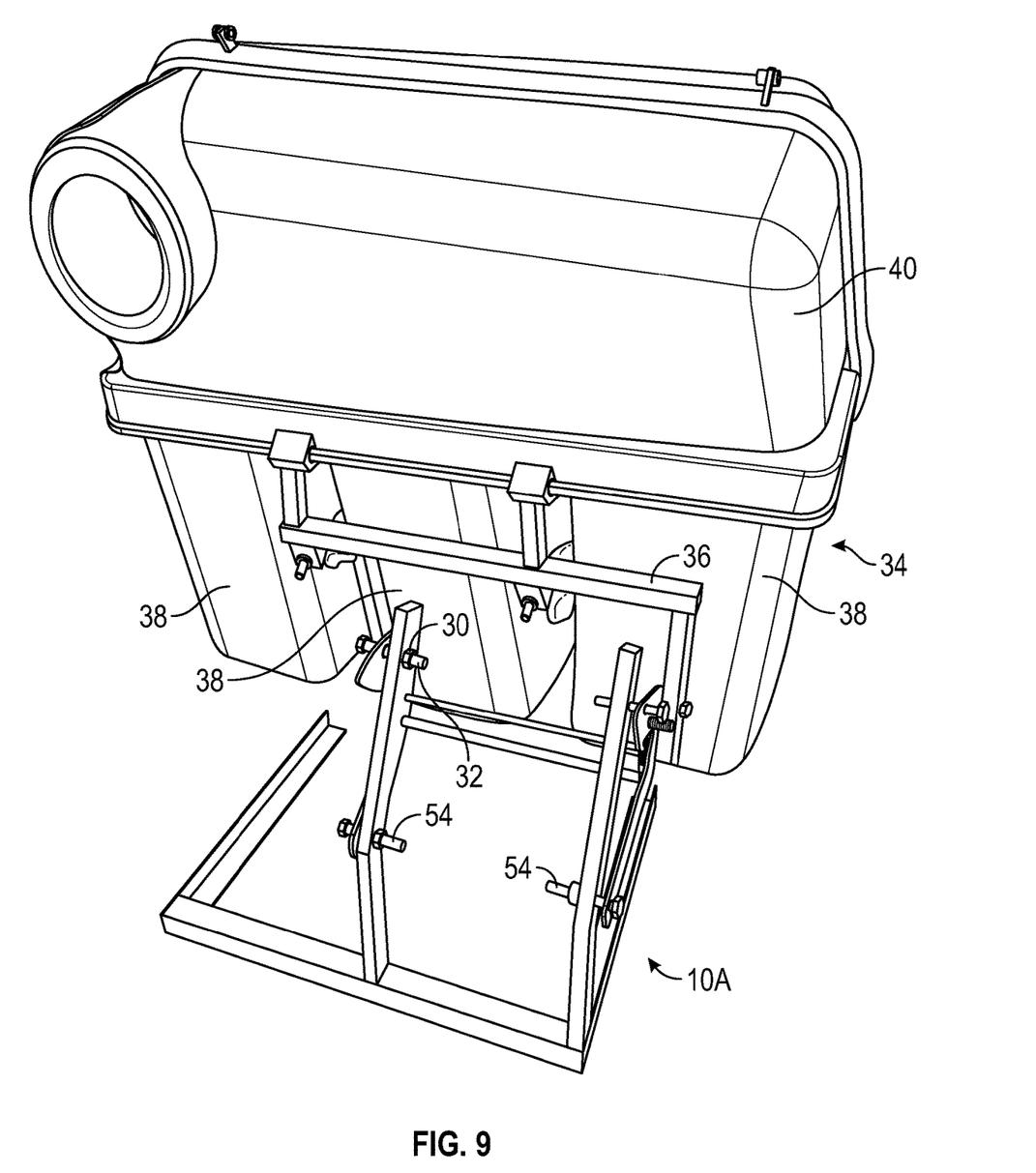
FIG. 9 shows an alternative embodiment of the stand, with the bagger frame and collection bags mounted thereon.
Figure 10:
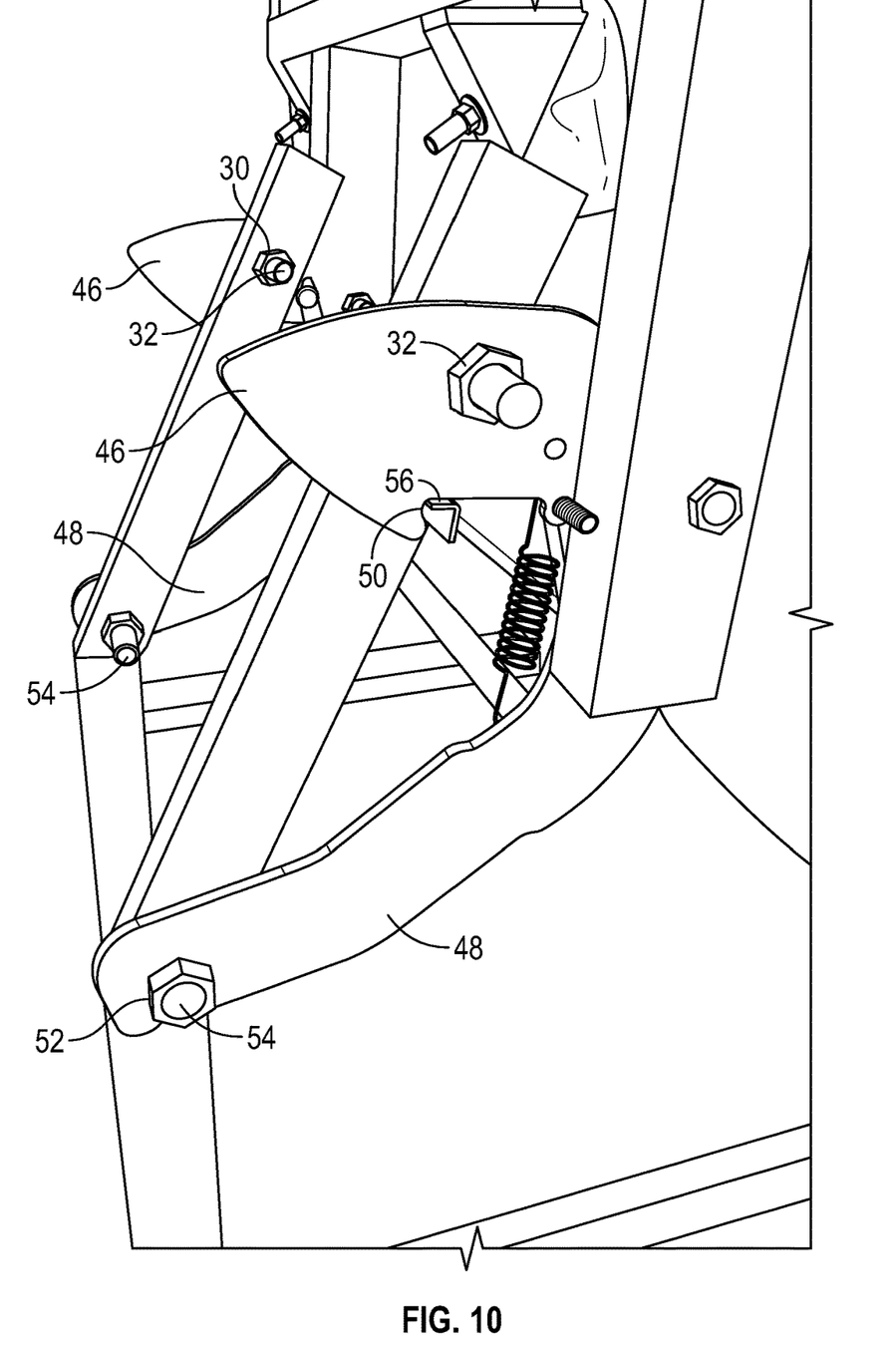
FIG. 10 is an enlarged view showing the bagger frame mounted on the stand shown in FIG. 9.

In the alternative embodiment of the stand 10A shown in FIGS. 9 and 10, there is no shelf, chute plates, or wheels. The arms of this embodiment function the same as the arms 14 of the preferred embodiment to support the bagger frame 36 and bags 38. In the alternative embodiment, the lower pins 28 are replaced with bolts 54 for receiving the notches 52 on the lower frame arms 48. As seen in FIG. 10, an angle iron 56 replaces the upper pins on the arms for retentive engagement by the hooks 50 on the upper frame arms of the bagger assembly. The pins 26, 28 and the angle iron 56 function as receivers to receive and retain the hooks 50,52 on the bagger frame.

It is understood that the configuration of the base can vary from that shown in FIGS. 1-4, without departing from the scope of the invention. For example, the arms 14 can have a forwardly curved profile. Another alternative is to replace the plates 24 with one or more pegs or a circular upstanding member defining a diameter to fit inside or receive one end of the chute 42 and support the chute in an upright position.

What is claimed:

1. In combination, a lawn mower grass bagger and a stand for supporting the grass bagger off the ground when the grass bagger is removed from the lawn mower, comprising:
    a frame on the grass bagger adapted to removably mount the grass bagger onto the lawn mower;
    a self-standing chute on the grass bagger having an inlet end removably mounted to the lawn mower and an outlet end removably connected to the grass bagger;
    a collection bag on the frame;
    a blower on the frame and being connectable to the bagger;
    the stand having a base;
    a pair of upright arms extending upwardly from the base and adapted to receive the frame;
    a shelf on the stand adapted to store the blower;
    at least one member extending upwardly the stand adapted to fit into the chute to retain the chute in an upright orientation; and
    the frame, chute and blower being separable from one another for independent positioning on the stand.

2. The combination of claim 1 wherein the frame hangs on the arms.

3. The combination of claim 1 further comprising wheels on the base.

4. The combination of claim 1 wherein the arms extend forwardly.

5. The combination of claim 1 wherein the arms each have a lower end connected to the base and an upper end extending forwardly from the lower end.

6. The combination of claim 1 wherein the frame of the bagger includes a pair of arms with terminal ends, and each terminal end having a hook, and each arm of the stand having a member to retentively engage the hooks of the arms of the frame of the bagger so as to support the grass bagger on the stand.

7. The combination of claim 1 wherein the frame includes hooks and the arms of the stand includes pegs for receiving the hooks.

8. The combination of claim 1 wherein the frame includes upper and lower hooks and the arms of the stand include upper and lower horizontal posts for receiving the upper and lower hooks, respectively.

9. The combination of claim 8 wherein at least one of the hooks is spring biased to snap over the respective post.

10. The combination of claim 8 wherein the upper and lower hooks are vertically and horizontally offset from one another, and the upper and lower posts are vertically and horizontally offset from one another.

11. The combination of claim 1 wherein the blower is stored on the shelf beneath the bag.

12. The combination of claim 1 wherein the shelf is on top of the base.

13. The combination of claim 1 wherein the frame is fastened to the arms to secure the frame and bag on the stand.

14. In combination, a grass bagger of a lawn mower and a storage stand for the grass bagger, the grass bagger including a frame, a chute, and a collection bag for catching grass from the lawn mower, the storage stand comprising:
    a base;
    a pair of arms extending upwardly from the base and having upper ends residing over the base;
    a member extending vertically upwardly from the base;
    wherein the grass bagger is removed from the lawn mower, and the frame and bag are separated from the chute, and then the frame is hooked onto the arms to support the frame and bag above the base, and the chute is mounted onto the member so as to extend upwardly above the base and adjacent the frame and bag.

15. The combination of claim 14 wherein the frame and the arms have four hook points.

16. The combination of claim 14 wherein the arms have horizontally extending posts upon which the frame hooks.

17. The combination of claim 14 wherein frame and the arms are secured together with fasteners extending through both the frame and the arms.

* * * * *